July 22, 1952  C. W. EARP ET AL  2,604,621
RADIO SYSTEM FOR AIRCRAFT GUIDANCE
Filed Aug. 11, 1943  3 Sheets-Sheet 1

Inventors
Charles William Earp
Charles Eric Strong.
By
Attorney

DIFFERENCE FREQUENCY CORRESPONDING TO HEIGHT

DIFFERENCE FREQUENCY CORRESPONDING TO DISTANCE

COMBINED HEIGHT AND DISTANCE DIFFERENCE FREQUENCIES

OUTPUT OF LIMITER V1

OUTPUT OF E

OUTPUT OF V2

Inventors
Charles William Earp
Charles Eric Strong

July 22, 1952     C. W. EARP ET AL     2,604,621
RADIO SYSTEM FOR AIRCRAFT GUIDANCE
Filed Aug. 11, 1943     3 Sheets-Sheet 3
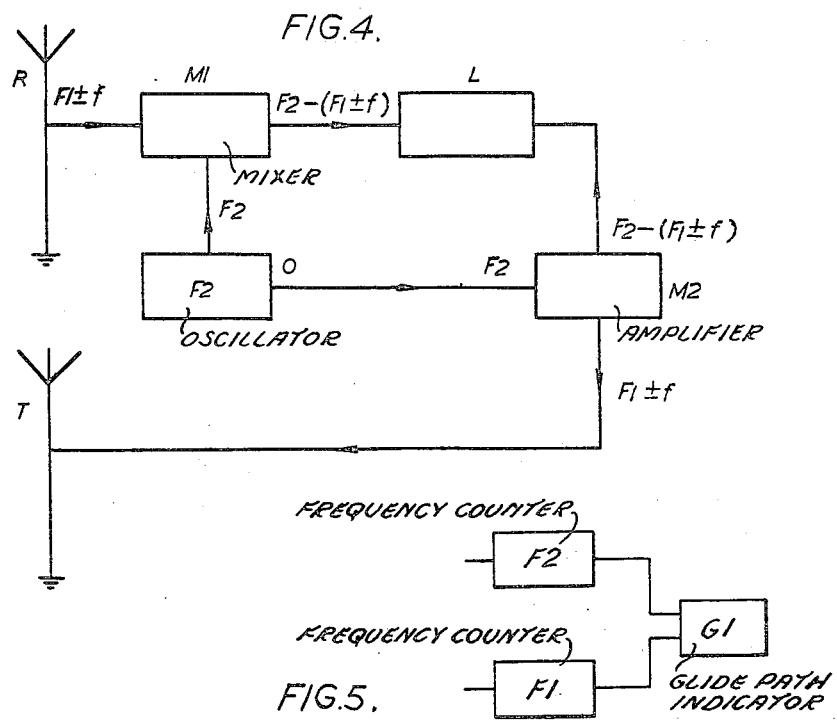
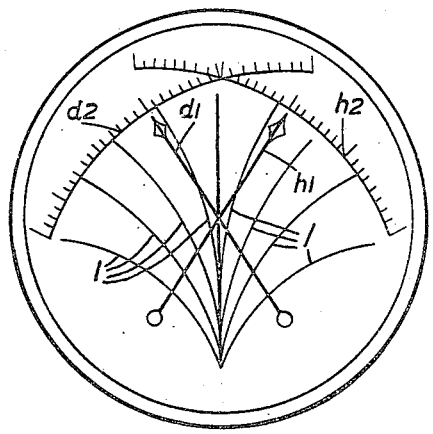
Inventors
Charles William Earp.
Charles Eric Strong.
By Edward ❧❧❧❧❧
Attorney Patented July 22, 1952

2,604,621

UNITED STATES PATENT OFFICE 2,604,621

RADIO SYSTEM FOR AIRCRAFT GUIDANCE

Charles William Earp and Charles Eric Strong, London, England, assignors, by mesne assignments, to International Standard Electric Corporation, New York, N. Y., a corporation of Delaware Application August 11, 1943, Serial No. 498,198
In Great Britain April 2, 1940

Section 1, Public Law 690, August 8, 1946
Patent expires April 2, 1960

3 Claims. (Cl. 343—10)

The present invention relates to radio guiding systems for aircraft and particularly to systems for giving radio guidance in a vertical plane to such craft when landing.

The objects of the invention are:

1. To provide in a radio blind landing system a glide path permitting the same apparatus carried on the aircraft to be used simultaneously for operating a radio altimeter and glide path indicator, thereby effecting economy in cost, weight and space of the aircraft apparatus in cases where it is desired to carry a radio altimeter.

2. To provide a radio glide path system, the fundamental principle of which is such that inherently the system produces a straight glide path.

3. To provide a radio glide path system, and apparatus for the system, by means of which interference with other stations is reduced and increased secrecy obtained as compared with systems of the type in which a beacon on the ground is substantially constantly in operation for denoting the glide path.

4. To provide a single system and apparatus permitting an aircraft to determine its height above the ground, and its distance from a predetermined object on the ground substantially ahead of the aircraft.

The glide path system according to the present invention comprises essentially—arrangements carried by the aircraft for radiating therefrom electromagnetic waves and at or near the landing field, a reflecting target, which term includes the preferred arrangements comprising a radio repeater for picking up energy from the aircraft and re-radiating it to the aircraft, means on said aircraft for receiving the reflected radiations from the earth and from the said target the distance from which it is desired to be known and for applying the reflected energies together with energy from the local source to operate indicators denoting height and distance respectively.

The generating, radiating, receiving and comparison apparatus on the aircraft are of known types and according to one embodiment are of the type used in a known altimeter system in which there is radiated radio frequency energy, the frequency of which is cyclically varied linearly with time, and the received reflected wave from the ground is compared as regards frequency with the contemporaneous transmitted wave, and the resultant current of the difference frequency operates a frequency counter indicating units of height.

For the purpose of the present invention it is necessary to receive waves from two reflectors, namely, the wave resulting from reflection by the ground and the wave resulting from the reflection or re-radiation from the target. Since in descent the height of the aircraft above the ground is always less than the distance from the target, two difference frequencies are yielded by the receiving apparatus after comparison of the received reflected energy with the contemporaneous local source energy, one difference frequency denoting height and the other, distance from the target. During the aircraft's descent both frequencies become progressively lower, but the lower of the two always represents height above the ground and the higher represents distance from the target. It will be observed that over part of the descent the frequency corresponding to the distance may be of a value which previously corresponded to altitude. Additional means are therefore required to cause the currents of the two difference frequencies to operate distance and height indicators respectively and, in addition, an indicator denoting variation in ratio between the two frequencies, whatever their absolute values and thus constituting a glide-path indicator.

The invention will be better understood from the following description of a practical embodiment of the invention and given by way of example only.

In the drawings:

Fig. 4 shows diagrammatically a suitable form of reflecting target located on the ground at or in the vicinity of a landing field;

Fig. 5 shows one form of a suitable type of indicator for use with the present invention.

Fig. 6 shows a modification of the circuit of Fig. 2.

Figure 1:
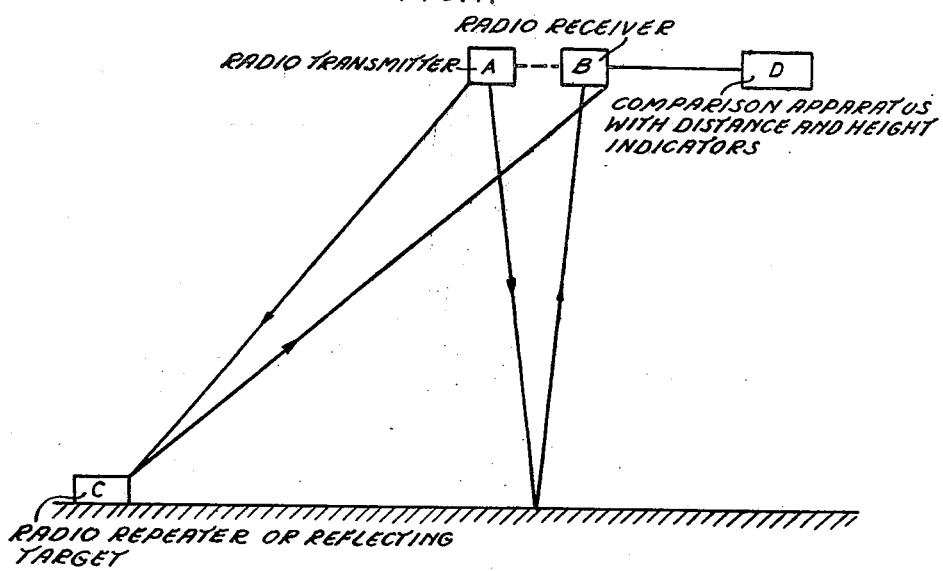
Fig. 1 illustrates diagrammatically the principle on which the invention is based.

Referring now to Fig. 1 of the drawings, A represents a source of radio frequency energy on the aircraft, the frequency of which is cyclically varied, C represents the reflecting target. Electromagnetic waves reflected or re-radiated from the target, and waves reflected from the ground, are received on the aircraft at B, and compared respectively in frequency with the frequency of the waves emitted by A at the moment of reception by B. Currents of the resulting two difference frequencies are passed to D which represents arrangements by which these difference frequencies convey to the pilot, measurements of height above the ground and of distance from the target respectively.

Figure 2:
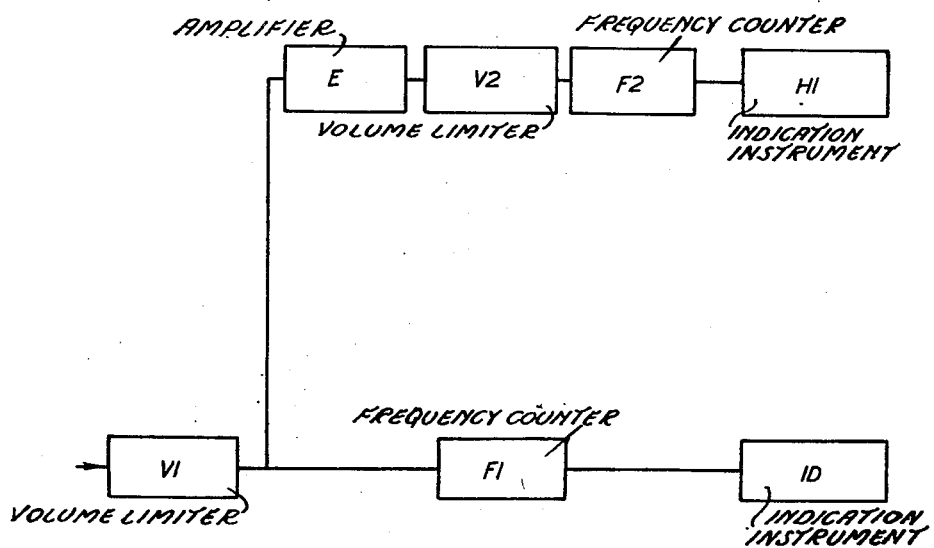
Fig. 2 shows diagrammatically a portion of the arrangements for obtaining the desired indications on the aircraft.

Fig. 2 shows the component parts of the arrangements by which the currents of the difference frequencies operate appropriate indicating instruments. The arrangement shown is by way of illustration only and other arrangements may naturally be utilised and fall within the scope of the appended claims. The action of the apparatus in Fig. 2 will be better understood by reference to Figs. 3a to 3f.

Figure 3A:
Figs. 3a–3f show various wave forms employed in explaining the operation of the arrangements shown in Fig. 2.
Figure 3B:
Figure 3C:
Figure 3D:
Figure 3E:
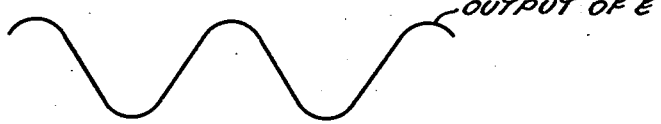
Figure 3F:

Referring to Fig. 2, the output from the receiver is applied to a first volume limited V1 and comprises oscillations of two frequencies represented in Figs. 3a and 3b. The values of these frequencies (difference frequencies Fd) are dependent on the difference $\Delta F$ between the maximum and minimum frequencies of the cyclic variation and the number Fm of cycles of frequency variation per second of the source on the aircraft and respectively on the latters' height and on its distance from the target. The distance D or height H is given by the equation:

$$F_d = \frac{4\Delta F F_m H(\text{or } D)}{C}$$

where C is the velocity of propagation of electromagnetic waves in space. However, the frequency corresponding to distance (Fig. 3b) is always greater than the frequency corresponding to height (Fig. 3a). The two frequencies in combination fed to the first volume limiter V1 are represented by Fig. 3c.

The output of the limiter V1 comprises a series of pulses (Fig. 3d), the frequency of which corresponds to the frequency of the "distance" oscillations (Fig. 3b). Part of this pulsating energy is fed to a frequency counter F1, which in turn feeds an indicating instrument ID. The frequency counter F1 and indicating instrument ID may be of conventional type, e. g. the counter may operate on the condenser charge/discharge principle and the indicating instrument may be a moving coil milliammeter.

The remainder of the output of the first volume limiter V1 is passed into an amplifier E, the characteristics of which are such that the currents of low frequencies are amplified to a greater extent than the currents of high frequencies. In consequence, this amplifier favours the lowest frequency component of the wave form shown in Fig. 3d, and the amplifier output comprises an oscillation (Fig. 3e), the frequency of which is the same as that of the height difference frequency (Fig. 3a). The amplifier E output is passed into a second volume limiter V2 from which energy pulses are obtained of the character shown in Fig. 3f. The pulses are fed to frequency counter F2 and an indicating instrument HI in the same manner as already described for the distance frequency oscillation.

The arrangement described thus gives separate and quantitative measurements of the height of the aircraft above ground and its distance from the target. By so controlling the angle of the aircraft relative to the ground as to maintain, during descent, a constant ratio between height and distance as revealed on the indicators, a straight glide path towards the ground may be followed of any chosen gradient.

Since in practice it would be inconvenient for the pilot to have to watch two instruments and from their constantly changing indications control his craft so as to keep a constant height/distance ratio, a glide path indicator may be used connected as GI in Fig. 6. This indicator may consist of two separate deflecting mechanisms operated respectively by the currents giving the height and distance indications, and controlling in opposition to each other a single needle so that various readings of the indicator denote various ratios of height to distance and hence different linear glide paths. Alternatively, the glide path indicator GI may comprise virtually, the height and distance indicators built into one unit in such a manner that the two needles travel up or down a common vertical scale. In such case it can be arranged that for a predetermined glide angle the needles move along the scale with their tips always opposite each other, irrespective of the actual deflection of each needle. Thus, if it be so arranged that the needle tips are at the top of the scale as the aircraft comes within range of the target, then the needles will swing progressively down the vertical scale as the craft lands; and correct angle of descent can be maintained by so controlling the craft as to keep the needle tips opposite to each other as the needles proceed down the scale.

In an alternative glide path indicator arrangement, the currents of the difference frequencies giving the height and distance measurements respectively are fed to respective indicating elements of a combined instrument, as shown in Fig. 5. In this arrangement the tip of one indicating needle h1 travels over a scale h2 indicating height and the tip of the other indicating needle d1 travels over a scale d2 indicating distance. The points of intersection of the two needles are calibrated on the dial in a series of lines l which indicate various constant ratios of height to distance.

In a further alternative arrangement providing a single indicator the frequency counters are arranged to provide equal energy outputs for a predetermined frequency ratio and these outputs are fed in opposition to a single indicating meter, so that a zero reading corresponds to the said predetermined frequency ratio and hence a predetermined linear glide path.

In the foregoing description, it has been assumed that the energy of the reflected wave received at the aircraft from the target is comparable with or preferably a little greater than the energy of the received wave due to ground reflection. This, however, is not essential.

In approaching the landing field, the distance meter will naturally not read correctly until the aircraft is within range of the target as might be denoted, for example, by a marker beacon. Until the pilot knows that he is within range of the target, no attention need by paid to the reading of the distance meter DI or of the glide path indicator GI since these will be operated by the only reflected wave received, namely, that corresponding to altitude.

The target C (Fig. 1) comprises a preselected reflecting object on the ground at or near the landing field, but preferably comprises an aerial system for picking up the energy of cyclically varying frequency from the aircraft, means for amplifying this energy, and an aerial system for radiating the amplified energy of cyclically varying frequency back to the aircraft. Preferably the aerial systems are made directive in directions along which the aircraft is intended to land.

Since for the system herein described it is generally desirable to use very high radio frequencies, there may be difficulty in directly amplifying the energy received at the target. A convenient way of amplification is illustrated in Fig. 4. The incoming energy collected by receiving antenna R may be considered as of frequency $F1 \pm f$, where $F1$ is the mean frequency of the source on the aircraft and $f$ is the degree of frequency modulation prevailing at a given instant. Current of frequency $F1 \pm f$ is passed into a mixer M1 together with the frequency F2 from the oscillator O as shown. The output of the mixer M1 comprises a frequency $F2-(F1 \pm f)$. By suitably choosing F2, the frequency of the energy at the output of the mixer may be arranged to be of such a value that it is easily and efficiently amplified in amplifier L. The output of the amplifier L is passed to a second mixer M2 in conjunction with energy of frequency F2 from the oscillator O, restoring the original frequency $F1 \pm f$ which is passed to the radiating aerial system T of the target repeating station.

In order to prevent singing of the target repeater station, conventional means such as a form of automatic volume control may be incorporated therein. It is, in any case, preferable to provide automatic volume control in the repeater station in order to compensate for the increasing signal strength received by the repeater collector R as the plane approaches; and it is an advantage to arrange that the automatic volume control so operates as actually to reduce the output of the repeater in addition to reducing its gain, so that as the plane approaches, the re-radiated waves received at the plane remain of substantially constant intensity and do not overpower the ground reflections.

Without the radio repeater target the system would be difficult or impossible to work inasmuch as the reflected waves received from a specially erected reflecting surface, would be of very low amplitude compared to the wave reflected from the ground. Moreover, reflection from surrounding miscellaneous reflecting surfaces would introduce dangerous errors and variations.

As compared to glide path systems in which a steady emission takes place from a beacon on the ground, the system described herein gives reduced interference and reduces or avoids the danger in war time of the enemy homing on the beacon. This follows from the fact that the beacon is operative only when aircraft approach to land.

The basic principle of the landing method rendered possible by the system according to the invention and hereinbefore described is the maintenance of a constant ratio of height to distance during descent. It follows that inherently the system produces a straight glide path.

What is claimed is:

1. In a navigational system for aircraft, a short-range high-frequency wave-reflection altimeter mounted on an aircraft, said altimeter being of the type which transmits frequency modulated waves and combines the received reflected waves from the earth's surface beneath the craft with the instantly transmitted waves to obtain beat-notes the frequency of which is indicative of altitude, a reference station located at a definitely known remote fixed point on the earth's surface, a radio receiving apparatus at said reference station capable of receiving the frequency modulated waves emitted by the altimeter on said aircraft, a radio transmitting apparatus at said reference station cooperatively connected with the said receiving apparatus at said station to retransmit the frequency modulated waves received by the receiving apparatus with sufficient power to be readily received by the altimeter receiver on said aircraft, filters on said aircraft cooperatively connected with the altimeter receiver to segregate the relatively low-frequency beat-notes indicative of altitude and the relatively high-frequency beat-notes resulting from the combination in the altimeter receiver of the retransmitted waves from said reference station with the instantly transmitted waves, a first meter connected with the filter segregating the relatively low-frequency beat-notes and responsive thereto to indicate altitude and a second meter connected with the filter segregating the relatively high-frequency beat-notes and responsive thereto to indicate the distance to the remote reference station, whereby the altitude of the aircraft above the earth's surface and the distance of the craft from a definitely known remote ixed point on the earth's surface may be simultaneously determined without substantially increasing the bulk and weight of apparatus required upon the aircraft for the determination of altitude alone by the use of frequency modulated waves.

2. In a navigational system for aircraft a short-range wave-reflection altimeter system mounted on an aircraft, a reference station located at a definitely known remote fixed point on the earth's surface, a receiving apparatus at said reference station capable of receiving the waves emitted by the altimeter system, a transmitting apparatus at said reference station cooperatively connected with the said receiving apparatus at said station to retransmit the waves received by the receiving apparatus with sufficient power to be readily received by the altimeter system on said aircraft, means on said aircraft for severally determining the time interval between the transmission of waves from said aircraft and the receipt of waves from the transmitting station at said reference point and the time interval between the transmission of waves from said aircraft and the receipt of reflections thereof from the surface of the earth beneath the craft whereby long-range distance determinations are obtained simultaneously with short-range altitude determinations without substantially increasing the amount of apparatus, in addition to the altimeter system, which is required on the aircraft.

3. In a navigational system for aircraft a short-range wave-reflection altimeter system mounted on an aircraft, a reference station located at a definitely known remote fixed point on the earth's surface, a receiving apparatus at said reference station capable of receiving the waves emitted by the altimeter system, a transmitting apparatus at said reference station cooperatively connected with the said receiving apparatus at said station to retransmit the waves received by the receiving apparatus with sufficient power to be readily received by the altimeter system on said aircraft, means on said aircraft for severally determining the time interval between the transmission of waves from said aircraft and the receipt of waves from the transmitting station at said reference point and the time interval between the transmission of waves from said aircraft and the receipt of reflections thereof from the surface of the earth beneath the craft, and means energized by said last named means for ascertaining the ratio of the height and distance as expressed by said intervals.

CHARLES WILLIAM EARP.
CHARLES ERIC STRONG.

REFERENCES CITED

The following references are of record in the file of this patent:

UNITED STATES PATENTS

| Number | Name | Date |
|---|---|---|
| 1,698,777 | Bown | Jan. 15, 1929 |
| 2,045,072 | Espenschied | June 23, 1936 |
| 2,134,716 | Gunn | Nov. 1, 1938 |
| 2,170,835 | Simon | Aug. 29, 1939 |
| 2,189,549 | Hershberger | Feb. 6, 1940 |
| 2,218,923 | Newhouse | Oct. 22, 1940 |
| 2,225,046 | Hunter | Dec. 17, 1940 |
| 2,248,215 | Budenbom | July 8, 1941 |
| 2,301,929 | Budenbom | Nov. 17, 1942 |
| 2,307,316 | Wolff | Jan. 5, 1943 |
| 2,371,979 | Phillips | Mar. 20, 1945 |
| 2,411,520 | Capen | Nov. 26, 1946 |
| 2,412,003 | Neufeld | Dec. 3, 1946 |
| 2,423,644 | Evans | July 8, 1947 |

FOREIGN PATENTS

| Number | Country | Date |
|---|---|---|
| 108,556 | Australia | Sept. 14, 1939 |